United States Patent [19]

Galanos

[11] 4,200,875
[45] Apr. 29, 1980

[54] APPARATUS FOR, AND METHOD OF, RECORDING AND VIEWING LASER-MADE IMAGES ON HIGH GAIN RETROREFLECTIVE SHEETING

[75] Inventor: Demosthenes G. Galanos, Ft. Walton Beach, Fla.

[73] Assignee: The United States of America as represented by the Secretary of the Air Force, Washington, D.C.

[21] Appl. No.: 929,468

[22] Filed: Jul. 31, 1978

[51] Int. Cl.² .......................................... G01D 15/00
[52] U.S. Cl. ................................. 346/1.1; 346/76 L
[58] Field of Search ..................... 346/1, 76 L, 108; 219/121 L, 121 LM; 350/105; 40/582, 583, 453, 454; 355/44, 77

[56] References Cited
U.S. PATENT DOCUMENTS

| | | | |
|---|---|---|---|
| 2,326,624 | 8/1943 | Gebhard et al. | 350/105 |
| 3,154,872 | 11/1964 | Nordgren | 350/105 |
| 3,708,378 | 1/1973 | Tung | 350/105 |
| 4,032,861 | 6/1977 | Rothrock | 331/94.5 C |
| 4,036,552 | 7/1977 | Lee et al. | 350/97 |
| 4,082,426 | 4/1978 | Brown | 350/105 |

OTHER PUBLICATIONS

3M Co. Product Bulletin, Sep. 15, 1970.
3M Co. Price List, May 1, 1971.

Primary Examiner—Michael L. Gellner
Assistant Examiner—W. J. Brady
Attorney, Agent, or Firm—Joseph E. Rusz; Arsen Tashjian

[57] ABSTRACT

Apparatus for, and method of, recording with radiation from a laser light beam a preselected pattern, that is transparent and/or opaque, on a target made of high gain retroreflective sheeting of the exposed-lens type, with the target inclined at a previously chosen angle; and, thereafter, viewing the recorded image of the pattern (which is recorded on the target by structural alteration, i.e., modification, of the target material that is caused by the laser light beam radiation), solely with the naked eye and in ambient light. The recorded image can be seen only when the target is inclined at the same angle at which the target was positioned when the pattern was recorded by the laser light beam radiation on the target.

7 Claims, 5 Drawing Figures

APPARATUS FOR, AND METHOD OF, RECORDING AND VIEWING LASER-MADE IMAGES ON HIGH GAIN RETROREFLECTIVE SHEETING

STATEMENT OF GOVERNMENT INTEREST

The invention described herein may be manufactured and used by or for the Government for governmental purposes without the payment of any royalty thereon.

BACKGROUND OF THE INVENTION

This invention relates to an apparatus for, and a method of, recording, with radiation from a laser light beam, a plurality of preselected patterns (either transparent and/or opaque to a laser light beam) on a target made of high gain retroreflective sheeting of the exposed-lens type; and, thereafter, selectively viewing any one of the recorded patterns, with the naked eye (i.e., without illumination by a laser light beam).

As a preliminary matter, and with reference to FIG. 1, it is to be noted and understood that the phrase "high gain retroreflective sheeting of the exposed-lens type", or the like, is intended to mean herein, as it does in the prior art, sheeting 10, FIG. 1, having a plurality of transparent glass microspheres, such as 11A–11H, inclusive, FIG. 1, that are partially embedded in a binder layer, such as 12, FIG. 1, and that are partially exposed above the binder layer, as shown in FIG. 1, with a reflective layer, such as 13, FIG. 1, adjacent to and disposed behind the embedded surface of each of the plurality of transparent glass microspheres, wherein the binder layer 12 is pigmented with carbon black 12A (to minimize any stray light that impinges upon the sheeting 10), and wherein the reflective material 13 is a vapor-deposited layer of aluminum.

Such sheeting 10, FIG. 1, is made by, and is commercially available from, the Minnesota Mining and Manufacturing Company of Saint Paul, Minn. 55133. The sheeting is well known in the art as "SCOTCHLITE" brand reflective sheetings "High Gain" No. 7610 and No. 7611.

An early and basic representative sheeting of this type, such as 10, FIG. 1, is shown and is described in U.S. Pat. No. 2,326,634, issued to Melvin L. Gebhard et al on 10 Aug. 1943, and reference thereto and reading thereof is recommended. It is here to be noted that two principal differences between sheetings No. 7610 (and No. 7611) and the basic sheeting described in U.S. Pat. No. 2,326,634 are: (1) the reflective layer, such as 13, FIG. 1, of the sheeting 10, FIG. 1, referred to in this application is a vapor-deposited layer of aluminum, rather than the aluminum foil shown and described in U.S. Pat. No. 2,326,634; and (2) the binder layer, such as 12, FIG. 1, is pigmented in carbon black, whereas such is not the case of the binder shown and described in U.S. Pat. No. 2,326,634. It is also to be noted that I am merely the user of this type of sheeting, such as 10, FIG. 1; and, that I am not in any way the inventor or improver thereof. As far as I know, sheetings No. 7610 and No. 7611 are proprietary to the Minnesota Mining and Manufacturing Company; and, these two particular sheetings appear to differ from each other only as to adhesive characteristics of any backing material, and such characteristics are of no importance to my invention.

My invention, which comprises an apparatus and a method, is the result of a phenomenon that I have discovered, namely: that, if a pattern is recorded with and by a laser light beam that is radiated on a target made of high gain retroreflective sheeting of the exposed-lens type, while the target is positioned in any arbitrarily previously chosen angle with reference to the longitudinal (i.e., principal) axis of the laser light beam, then the recorded pattern (i.e., image) which is recorded on the target by structural alteration (i.e., modification) of the target material by the laser light beam radiation, can be seen thereafter with the naked eye if, and only if, the target is again positioned at that same angle. Stated a different way, I have found that, if a plurality of different preselected patterns are individually and separately recorded, at different angles, with the radiation from a laser beam on the same target of this type of sheeting, then each of the recorded patterns is visible only when viewed at the angle at which it was recorded by the laser light beam radiation on the target.

By the use of the discovery of this phenomenon, I am able with my inventive apparatus and method to attain many new, useful and unobvious results involving multiple images stored on the same target, or involving one image stored on multiple targets at different angles (e.g., animation), and the like.

I have, thereby, significantly advanced the state-of-the-art.

SUMMARY OF THE INVENTION

Succinctly, this invention pertains to an apparatus for, and a method of, recording and viewing laser-made images on high gain retroreflective sheeting of the exposed-lens type.

Accordingly, the principal object of this invention is to provide such an inventive apparatus and such an inventive method.

This principal object, as well as other related objects, of this invention will become readily apparent after a consideration of the description of my invention, in conjunction with reference to the Figures of the drawings.

DESCRIPTION OF THE PREFERRED EMBODIMENT

Figure 2:
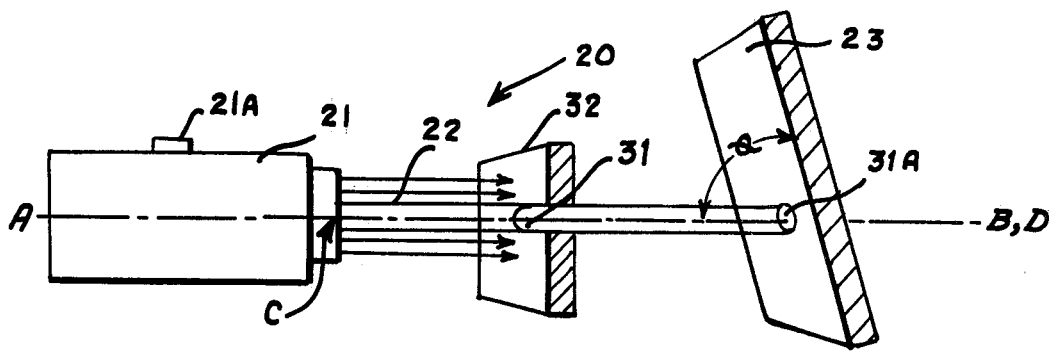
FIGS. 2 and 4 show a preferred embodiment of my inventive apparatus in side elevation and in simplified schematic form.
Figure 4:
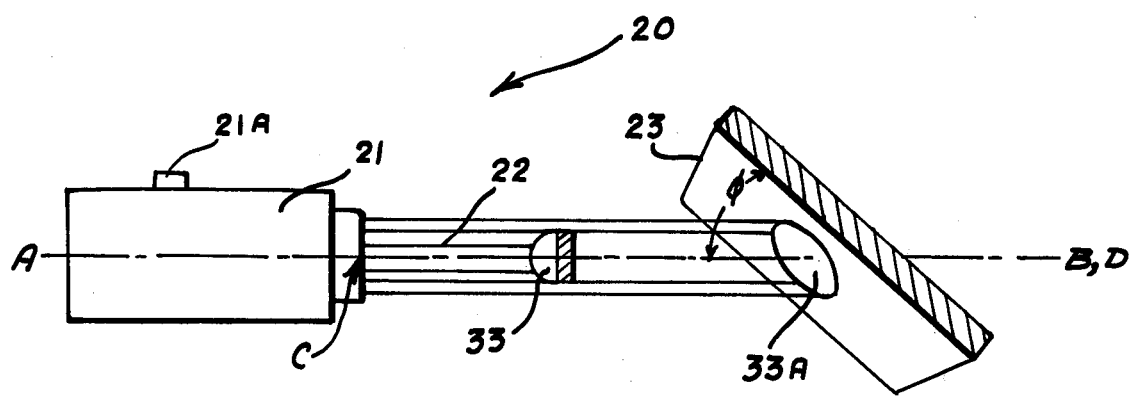

With reference to FIGS. 2 and 4, therein is shown a preferred embodiment 20 of my inventive apparatus.

In its most basic and generic form, the preferred embodiment 20 comprises: a laser, such as 21, which can be selectively actuated by suitable means (such as by pushbutton switch 21A) to emit an output laser light beam, such as 22, (sometimes also referred to herein as "laser light beam radiation" or the like) wherein the laser 21 has an optical axis, such as A-B, and wherein the emitted laser light beam (radiation) 22 has a longitudinal axis, such as C-D, that is coincident with the optical axis A-B of the laser 21; a target, such as 23, that is made of high gain retroreflective sheeting of the exposed-lens type, and that is disposed in optical alignment with the laser 21 and the emitted laser light beam (radiation) 22, wherein the target 23 can be selectively and variably inclined at a previously chosen and different angle, such as $\theta$ in FIG. 2 and $\phi$ in FIG. 4, with relation to the optical axis A-B of the laser 21 and to the coincident longitudinal axis C-D of the emitted laser light beam (radiation) 22, whereby when the laser 21 is activated and emits the laser light beam (radiation) 22, that beam 22 (or in a particular situation, a pertinent portion of that beam 22) impinges upon target 23; and, a plurality of different preselected patterns (e.g., transparent ones, such as 31, FIG. 1, which comprises a circular opening in an opaque mask 32; and/or, opaque ones, such as 33, FIG. 4, which comprises an opaque disk), wherein each one of the patterns is smaller in size than the target 23, and each one of the patterns is individually and separately interposeable and/or is, in fact, interposed between, and is positioned in optical alignment with, the laser 21 and the same target 23.

It is here to be noted that, as a matter of maintaining simplicity of FIGS. 2 and 4, the respective patterns shown as being used and recorded (i.e., 31 in FIG. 2 and 33 in FIG. 4) are equal to or smaller than the diameter of the laser light beam (radiation) 22. This is solely for illustration purposes. The patterns may be larger than the diameter of the beam 22, because the laser 21 can be moved in a scanning action, and the laser beam 22 can thereby be used to completely "cover" the pattern. However, the selected patterns must be smaller than the target 23.

The laser 21 preferably is, but need not be, a high energy one of the "Q-switched" type having a power of one Joule. Also preferably, but not necessarily, the emitted laser light beam 22 has a diameter of ⅜ inch and a pulse width of 90 nanoseconds.

DESCRIPTION OF THE INVENTIVE METHOD

The very basic and fundamental steps of my inventive method of recording a plurality of preselected patterns and, thereafter, selectively viewing any one of the recorded patterns comprises, essentially, seven steps.

Firstly, I position the laser 21, whereby when I activate it by using switch 21A, the laser 21 emits an output beam of laser light radiation 22. The laser 21 has an optical axis A-B and, the emitted laser light beam (radiation) 22 has a longitudinal axis C-D that is coincident with the optical axis A-B of the laser 21.

Figure 1:
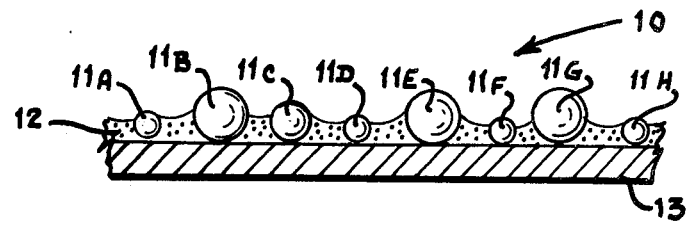
FIG. 1 is a side elevation view in simplified form, partially in cross section, partially schematic, partially pictorial, and partially fragmented of the basic structure of a representative sheeting of the high gain, exposed-lens type.

Next, I position the target 23 (which as has been previously stated, is made of high gain retroreflective sheeting of the exposed lens type, such as 10, FIG. 1) in optical alignment with the laser 21 and the laser light beam 22, whereby when I activate the laser 21, the emitted laser light beam (radiation) 22 impinges upon the target 23 and structurally alters (i.e., modifies) the material of which the target 23 is made.

Then, I interpose, individually and separately, each one of a plurality of different preselected patterns, such as 31, FIG. 2, and 33, FIG. 4, between and in optical alignment with, the laser 21 and the target 23. It is to be noted, as previously indicated, that the selected patterns must, of course, be smaller than target 23, if it is desired that the image of the entire pattern be recorded on target 23. However, it is equally important to remember that the diameter of the beam 22 as compared to the size of the pattern is immaterial, because even if the laser light beam (radiation) 22 is smaller than the pattern, the laser 21 can be moved in a scanning action to completely "cover" the pattern with the beam (radiation) 22.

Next, I incline the target 23 at a previously chosen and different angle (such as $\theta$, FIG. 2; and, such as $\phi$, FIG. 4), with relation to the optical axis A-B of the laser 21 and with relation to the coincident longitudinal axis C-D of the laser light beam (radiation) 22, for each one of the plurality of different preselected patterns (such as 31, FIG. 2; and, such as 33, FIG. 4), individually and separately.

Then, I activate the laser 21, while each one of the different preselected patterns is interposed, individually and separately, between the laser 21 and the target 23, whereby the emitted output laser light beam (radiation) 22 impinges upon the interposed pattern, as shown in FIGS. 2 and 4, and thereby records, sequentially and separately on the same target (by structurally altering, i.e., modifying, the target material), an image of each of the different patterns. The recorded images are 31A, FIGS. 2 and 3, of transparent pattern 31, FIG. 2; and, 33A, FIGS. 4 and 5, of opaque pattern 33, FIG. 4.

Next, I deactivate the laser 21 with, and by the use of, switch 21A.

Figure 3:
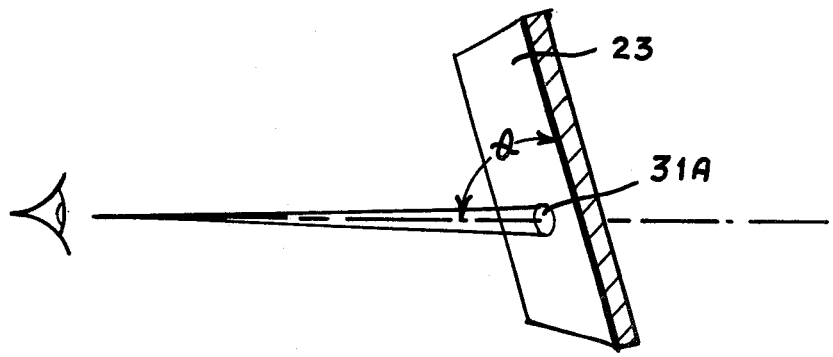
FIGS. 3 and 5 show, in side elevation view and in simplified schematic form, the result of practicing the steps of my inventive method.
Figure 5:
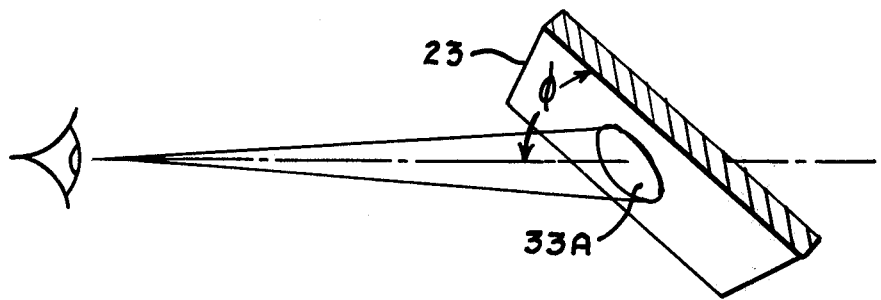

Lastly, as shown in FIGS. 3 and 5, I view selectively, separately and individually, any one of the recorded images (such as 31A, FIG. 3, and 33A, FIG. 5) of the patterns used by inclining the target 23 at the same angle at which the target 23 had been inclined when that image of that pattern was recorded on the target by structural alteration, i.e., modification, of the target material by the laser light beam (radiation) 22.

As a matter of preference, and not of limitation, I prefer to use a high energy laser of the "Q-switched" type having a power of one Joule, an emitted laser light beam of a diameter of ⅜ inch, and a pulse width of 90 nanoseconds.

MANNER OF USE OF THE PREFERRED EMBODIMENT

The manner of use of the preferred embodiment 20, FIGS. 2 and 4, of my inventive apparatus can be ascertained very easily by a person of ordinary skill in the art from the foregoing description, coupled with reference to the Figures of the drawings.

For others, it is sufficient to say in explanation that, if one follows the steps of my inventive method as previously set forth herein, and refers to the Figures of the drawings, one can see how the patterns, such as 31 and 33 can be recorded on target 23 (by structural alteration, i.e., modification, of the target material by the radiation 22 from the laser 21) and, thereafter, their respective images 31A, FIG. 3, and 33A, FIG. 5, can be selectively and separately viewed.

CONCLUSION

It is abundantly clear from all of the foregoing and from the drawing, that the stated and desired principal object, as well as related objects, of my invention have been achieved.

It is to be noted that, although there have been described the fundamental and unique features of my inventive apparatus, as applied to a particular preferred embodiment, other embodiments, adaptations, additions, omissions, and the like will occur to, and can be made by, those of ordinary skill in the art, without departing from the spirit of the inventive apparatus.

Additionally, because of my teaching, it will occur to others of ordinary skill in the art that, in appropriate particular circumstances, the number and/or the sequence of the basic and fundamental steps of my inventive method can be varied. For example, the same pattern may be recorded on different targets at different angles to create what appears to the viewer to be movement of the recorded pattern; or, the same pattern may be recorded on the same target at different angles also to create "movement".

What is claimed is:

1. An apparatus for recording, by laser light beam radiation, a plurality of preselected patterns and, thereafter, selectively viewing any one of said recorded patterns, comprising:
   a. a laser which can be selectively activated to emit radiation in the form of an output laser light beam, wherein said laser has an optical axis, and wherein said output laser light beam radiation has a longitudinal axis coincident with said optical axis of said laser;
   b. a target, made of high gain retroreflective sheeting of the exposed-lens type, disposed in optical alignment with said laser and said laser light beam radiation, wherein said target can be selectively and variably inclined at a previously chosen and different angle with relation to said optical axis of said laser and with relation to said coincident longitudinal axis of said laser light beam radiation, whereby when said laser is activated and emits said laser light beam radiation, said beam radiation impinges upon said target;
   c. and, a plurality of different preselected patterns, wherein each of said patterns is smaller than said target, and wherein each one of said patterns is individually and separately interposed between, and is positioned in optical alignment with, said laser and said target, whereby when said laser is activated and emits said laser light beam radiation, said beam radiation impinges upon said individual and separate pattern and records by said laser light beam radiation an image of said pattern on said target, thereby structurally altering said high gain retroreflective sheeting of the exposed-lens type, of which said target is made, in a manner corresponding to said pattern;

whereby said target is inclined at the same angle at which said image was recorded by said laser light beam radiation on said target, said recorded image can be viewed.

2. The apparatus, as set forth in claim 1, wherein said laser is a high energy laser of the "Q-switched" type having a power of one Joule.

3. The apparatus, as set forth in claim 2, wherein said emitted output laser light beam has a diameter of ⅜ inch and a pulse width of 90 nanoseconds.

4. The apparatus, as set forth in claim 3, wherein some of said plurality of preselected patterns are transparent to said laser light, and some are opaque to said laser light.

5. A method of recording a plurality of preselected patterns and, thereafter, selectively viewing any one of said recorded patterns, comprising:
   a. positioning a laser whereby when said laser is activated, it emits an output beam of laser light radiation, wherein said laser has an optical axis and said laser light beam radiation has a longitudinal axis coincident with said optical axis of said laser;
   b. positioning a target, made of high gain retroreflective sheeting of the exposed-lense type, in optical alignment with said laser and with said laser light beam radiation, whereby when said laser is activated, said emitted laser light beam radiation impinges upon said target;
   c. interposing, individually and separately, each one of a plurality of different preselected patterns, between and in optical alignment with, said laser and said target, wherein each of said patterns is smaller than said target;
   d. inclining said target at a previously chosen and different angle, with relation to said optical axis of said laser and said coincident longitudinal axis of said laser light beam radiation, for each one of said plurality of different preselected patterns, individually and separately;
   e. activating said laser, while each one of said different preselected patterns is interposed, individually and separately, between said laser and said target, whereby said emitted output laser light beam radiation impinges upon said interposed pattern and, thereafter, impinges upon said inclined target, thereby recording, sequentially and separately on said target, by structurally altering said target material, an image of each of said patterns;
   f. deactivating said laser;
   g. and, viewing, selectively, separately and individually, any one of said recorded images of said patterns by inclining said target at the same angle at which said target was inclined when said selected image of said pattern was recorded on said target by said structural alteration of said target material by said laser light beam radiation.

6. The method, as set forth in claim 5, wherein said laser is a high energy laser of the "Q-switched" type having a power of one Joule.

7. The method, as set forth in claim 6, wherein said emitted laser light beam has a diameter of ⅜ inch and a pulse width of 90 nanoseconds.

* * * * *